United States Patent [19]
Yamamoto

[11] 3,791,145
[45] Feb. 12, 1974

[54] METHOD FOR REDUCING EXHAUST NOXIOUS EMISSION OF ROTARY ENGINE AND THE SYSTEM THEREFOR

[75] Inventor: Kenichi Yamamoto, Hiroshima, Japan

[73] Assignee: Toyo Kogyo Co., Ltd., Aki-gun, Hiroshama-ken, Japan

[22] Filed: Mar. 8, 1972

[21] Appl. No.: 232,671

[30] Foreign Application Priority Data
Mar. 10, 1971  Japan.............................. 46-13231
May 8, 1971    Japan.............................. 46-40445

[52] U.S. Cl..................... 60/286, 60/294, 60/901, 123/8.01, 123/182
[51] Int. Cl............................................ F02b 75/10
[58] Field of Search..... 60/274, 901, 284, 286, 294; 123/182, 8.01, 8.07, 8.09, 8.13

[56] References Cited
UNITED STATES PATENTS
| | | | |
|---|---|---|---|
| 3,228,185 | 1/1966 | Bergstrom | 60/289 |
| 3,270,719 | 9/1966 | Hamada | 123/182 |
| 3,446,190 | 5/1969 | Bensinger | 123/8.01 |
| 3,451,213 | 6/1969 | Lang | 60/294 |
| 3,531,932 | 10/1970 | Froede | 60/304 |
| 3,559,401 | 2/1971 | Takahashi | 60/286 |
| 3,662,540 | 5/1972 | Murphey | 60/274 |

*Primary Examiner*—Douglas Hart

[57] ABSTRACT

Method and system for reducing unburned and partially burned noxious gases inevitably contained in engine exhaust gases of a rotary engine having an exhaust gas cleaner in its exhaust system. In the method and system, a fresh air-fuel mixture existing in the engine chamber is periodically introduced into the exhaust system directly into or upstream of the exhaust gas cleaner in response to the compression condition of the engine chamber, thus improving the afterburning condition of the exhaust gas cleaner through warming-up. For this purpose, an enriched mixture left behind in a trailing portion of the engine chamber may exclusively be drawn into the cleaner so as to uniformalize the mixture ratio distribution in the whole engine chamber. Furthermore, the mixture may be shut off when the operating temperature of the cleaner is above a predetermined level dictating that the warming-up thereof is completed.

19 Claims, 3 Drawing Figures

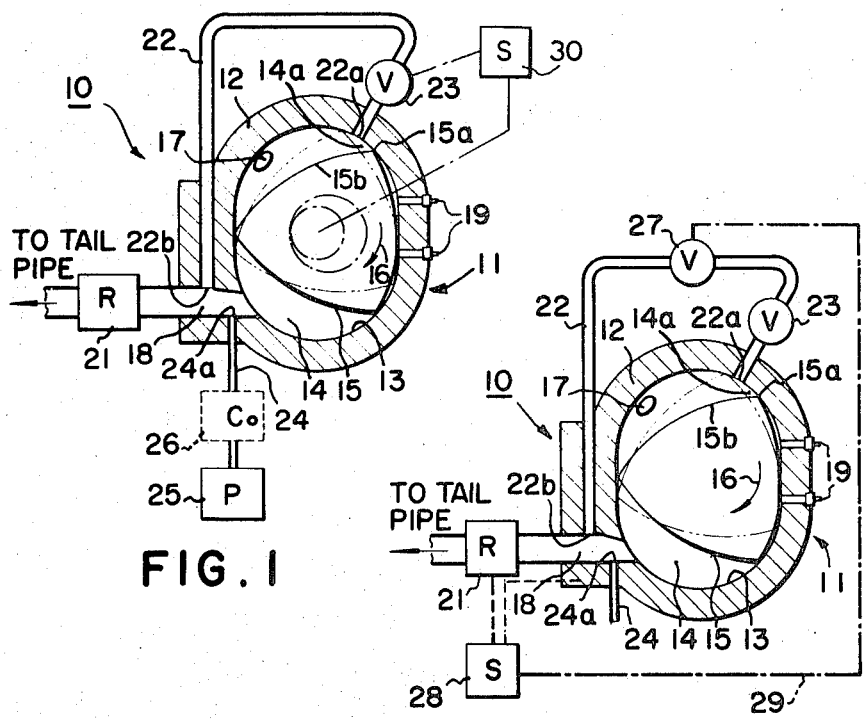
FIG.1
FIG.2
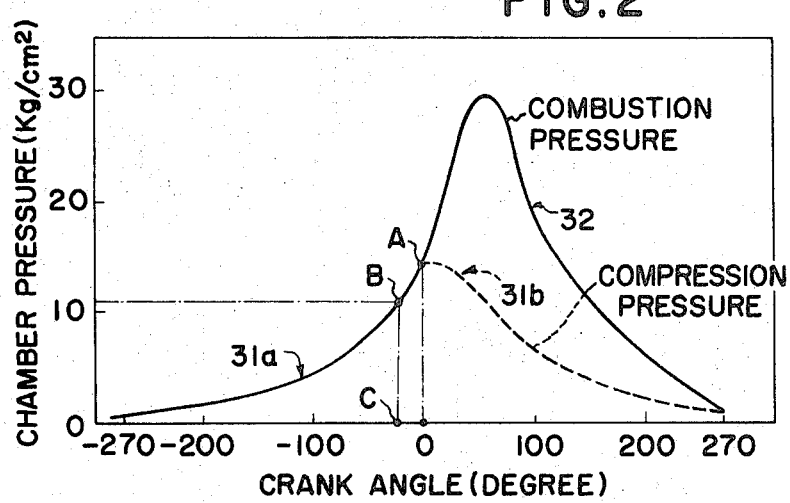
FIG.3

METHOD FOR REDUCING EXHAUST NOXIOUS EMISSION OF ROTARY ENGINE AND THE SYSTEM THEREFOR

BACKGROUND OF THE INVENTION

The present invention relates generally to an internal combustion engine of rotary type, and more particularly to a system for reducing unburned and partially burned noxious gases inevitably contained in engine exhaust gases of such rotaty engine as having an exhaust gas cleaner in its exhaust system.

The presence of unburned and partially burned noxious gases in the engine exhaust gases is of keen interest to the automobile industry for a serious reason of the so-called "air pollution." In order to solve problems concomitant with this reason, numerous attempts have been heretofore made, including an effort to provide in an exhaust system downstream of the engine exhaust port an exhaust gas cleaner, such as, an after-burner or a chemical converter using a catalyst, in which the contaminated exhaust gases containing hydrocarbons and/or carbon monoxide are to be reburned in the presence of fresh air or some suitable oxidizer.

Difficulties have, however, been encountered by the prior art methods in effectively reducing the noxious gases during a certain mode of automobile operation. Immediately after an internal combustion engine is initially started, the exhaust gas cleaner is kept cold for a while, with its deteriorated reburning ability. Thus, during the idle operation of the engine until it is sufficiently warmed up, the exhaust gas cleaner does not restore its high reburning ability, leaving a considerable amount of such air pollutants to issue from the exhaust tail pipe.

Apart from the above difficulties common to any type of internal combustion engine, there is also a serious problem inherent to a rotary engine. As is well known in the art, on intake and compression strokes of a rotary engine an air-fuel mixture is locally enriched especially in the neighbourhood of the trailing portion of the engine chamber. This is partly because fuel droplets, if any, of relatively large size tend to be left behind in the course of the intake and compression strokes due to their inertial properties, and partly because the sealing members mounted on the lobes of the rotor are apt to sweep off, as the rotor rotates in its regular sequence, the liquid fuel layer deposited on the inner surface of the engine center housing. When, as a result, the air-fuel mixture as a whole is ignited near the termination of the compression stroke, namely, immediately anteriorly to the T.D.C. (top dead center) point, a locally irregular combustion is accomplished in the engine combustion chamber, thus producing a quantity of reaction intermediates such as hydrocarbons or carbon monoxide. This unfavourable combustion phenomenon is found dominant especially during the idle or warming-up operation of the rotary engine when the engine temperature remains lowered and when the cleaning ability of the exhaust gas cleaner remains deteriorated. In the long run, the major cause for which it is practically impossible to minimize the noxious gas content in the exhaust gases of a rotary engine even with an exhaust gas cleaner is that the leading and trailing portions of the engine chamber under compression contain air-fuel mixtures of different mixture ratios.

SUMMARY OF THE INVENTION

According to a primary aspect of the present invention, a fresh air-fuel mixture existing in an engine chamber under compression of a rotary engine having an exhaust gas cleaner in its exhaust system is periodically introduced into the exhaust system directly into or upstream of the exhaust gas cleaner in response to the compression condition of the engine chamber so that the afterburning condition of the exhaust gas cleaner may be improved through warming-up by the fresh air-fuel mixture introduced.

According to another important aspect of the invention, the periodic introduction of the fresh air-fuel mixture is effected by drawing an enriched fresh air-fuel mixture left behind in a trailing portion of the engine chamber so that the distribution of the mixture ratio in the whole engine chamber may be uniformalized.

According to a further important aspect of the invention, the periodic introduction of the fresh air-fuel mixture is shut off when the operating temperature of the exhaust gas cleaner is above a predetermined level dictating that the warming-up thereof is completed.

It is therefore an object of the present invention to provide an improved method and system for use with an internal combustion engine of rotary type having an exhaust gas cleaner in its exhaust system, which method and system implement the above aspects for reducing unburned and partially burned noxious gases inevitably contained in the engine exhaust gases.

BRIEF DESCRIPTION OF THE DRAWING

Other advantages and objects of the invention will become apparent from the following detailed description taken together with the accompanying drawing, in which:

FIG. 1 is a sectional view of an exhaust noxious emission reducing system of the invention for use with a rotary engine;

FIG. 2 is similar to FIG. 1 but shows another embodiment; and

FIG. 3 is a characteristic illustration of a relationship between the chamber pressure and crank angle of a rotary engine.

DESCRIPTION OF THE PREFERRED EMBODIMENTS

Referring now to FIG. 1, an exhaust noxious emission reducing system according to the present invention is generally designated at numeral 10 and is used in combination with an internal combustion engine 11. This rotary engine 11 may be any conventional type and will be of rotary type described, by way of example, to include an engine housing composed of an annular center housing 12 having a trochoidal inner peripheral wall 13 and side walls (not shown), both defining an engine chamber 14. A generally trigonal rotor or rotary piston 15 is eccentrically rotatably mounted about a crankshaft (not shown) within the engine chamber 14. This rotor 15 is provided at its respective apex 15a and flank 15b with suitable sealing members (not shown), thus establishing fluid tight seal between the rotor 15 and inner wall 13. As the rotor rotates about the crankshaft in the direction of an arrow 16, four strokes are carried out in the regular sequence of intake, compression, explosion and exhaust. For effecting these strokes, an intake port 17 is formed, as shown, in the engine housing and operates to admit a fresh air-fuel mixture usually properly atomized into the combustion zone of the engine chamber 14. In the engine housing, is also formed an exhaust port 18 for expelling the burned gases from the engine chamber 14. A suitable ignition means 19, which is shown two in number, is also mounted in the engine housing for igniting the air-fuel mixture in the combustion zone. In order to afterburn or consume the unburned or partially burned noxious gases, the rotary engine 11 of shown type is provided with an exhaust gas cleaner 21 which is usually located in an exhaust system (not numbered) downstream of the exhaust port 18. This exhaust gas cleaner 21 may be of any type, such as, an after-burner or a chemical converter using a catalyst, in which the contaminated exhaust gases are to be consumed in the presence of air or some kind of oxidizer.

The system 10 of the invention generally includes a bypass conduit 22 and suitable control means 23, as shown. The bypass conduit 22 is provided at its both ends with an inlet port 22a open into the engine chamber 14 and with an outlet port 22b open into the exhaust port 18, as illustrated, or directly into the exhaust gas cleaner 21. The inlet port 22a is, more specifically, located in a portion of the engine housing which defines an engine chamber under compression. However, the inlet port 22a preferably is located in the engine chamber under intake when the rotor 15 is in a rotational position which is depicted by the solid line, indicating that the combustible air-fuel mixture is about to be ignited. It is easily understood that the inlet port 22a may be formed in either of the side walls at the rotationally corresponding position thereof. In any event, the inlet port 22a is designed to open at least into an engine chamber under compression 14a.

Turning to FIG. 3, the position of the rotor 15 depicted by the solid line corresponds in a compression pressure curve, as illustrated as a solid line 31a and a dotted line 31b, to a point A indicative of the so-called T.D.C. (top dead center) point. As is well known, this T.D.C. point implies that the crank angle is zero degree with the highest compressure pressure. Another point B riding on the solid curve 31a thus indicates that the compression pressure is slightly lower than that miximum, in other words, that the crank angle as located by another point C is immediately anterior to the T.D.C. point. After ignition, the chamber pressure abruptly increases on a characteristic curve 32, as shown in FIG. 3.

Reverting now to FIG. 1, the control means 23 is mounted midway of the bypass 22 and responds to the compression condition of the engine chamber 14a in terms directly of the compression pressure therein or of the crank angle so that it can permit periodic introduction of the compressed air-fuel mixture by way of the bypass conduit 22 into the exhaust gas cleaner 21. The control means 23 may be of any prior art valve which is preset to open when the rotor 15 assumes the rotational position as shown by the dotted line. This rotational position is dictated by the particular point B in terms of the chamber pressure or by the specific point C in terms of the crank angle.

The control means 23 may be a pressure relief valve which is directly responsive to the compression pressure in the engine chamber under compression 14a. A solenoid valve may also be employed as the control means 23 and is adapted to open when energized. In this instance, a crank angle sensor (not shown) is used for supplying an electric signal to the solenoid valve so as to energize the same when the crank angle reaches the level of C just anterior to the T.D.C. point. Furthermore, the control means 23 may preferably include a usual mechanical valve adapted to open when actuated, and a mechanical linkage (not shown) associated with the rotation of the rotor 15 for actuating the mechanical valve when the crank angle reaches the level of C. These means for controlling the control means 23 as a function of the sensed crank angle are shown generally by block 30 (FIG. 1).

When, in operation, a fresh air-fuel mixture is sucked into the engine chamber 14 through the intake port 17, the air-fuel mixture is then compressed therein as the rotor 14 rotates on the compression stroke until it assumes the rotational position of the solid line, as shown. Meanwhile, the control valve 23 opens at the moment when the rotor 15 passes the position of the dotted line. With this valve 23 open, a calibrated amount of air-fuel mixture is drawn or expelled through the bypass conduit 22 into the exhaust port 18 and immediately later into the exhaust gas cleaner 21 for afterburning. It should be appreciated here that with the inlet port 22a located in the trailing portion of the engine housing defining the chamber under compression, a locally enriched portion of air-fuel mixture can be introduced into the exhaust gas cleaner 21. This advantage will be reflected by the fact that the distribution of the mixture ratio is accordingly uniformalized in the engine combustion chamber, with the resultant regular combustion producing less unburned and partially burned content in the engine exhaust gases.

As is most experienced in the idle and high acceleration of the automobile operation, the air-fuel mixture expelled from the trailing portion of the chamber under compression is of over-rich nature so that it is quite desirable to supply secondary air before the mixture enters the exhaust gas cleaner 21. In this way, a sufficient amount of fresh and still non-contaminated air is supplied into the cleaner 21 so as to improve the combustion condition of the same. In other words, the cleaner 21 can be properly preheated or warmed up within shortened time period.

In order to effect the introduction of the fresh secondary air, a secondary air means is provided, including a secondary air conduit 24 having an outlet port 24a open into the exhaust port 18 in the vicinity of the outlet port 22b of the bypass conduit 22. An air pump 25 may preferably be provided to have fluid communication with the secondary air conduit 24 for pumping out therethrough secondary fresh air having a pressure level higher than exhaust back pressure which may probably obtain in the exhaust port 18. It is also preferred that the introduction of the secondary air is performed in a manner to sufficiently admix the secondary air with the engine exhaust gases containing the fresh air-fuel mixture. Between the secondary air conduit 24 and air pump 25 is desirably mounted an air container 26 for temporarily storing the secondary air before its introduction into the exhaust port 18.

With these in mind, although the heating of the exhaust gas cleaner 21 during the idle or warming-up operation is promoted by the embodiment of the present system of FIG. 1, there arises some drawback from the operation of the control valve 23. That is, since the control valve 23 opens and closes merely in response to the compression condition of the engine chamber 14 under compression, the air-fuel mixture continues to be expelled on the compression stroke even after the exhaust gas cleaner 21 is sufficiently warmed up to have a proper cleaning effect. This inevitably invites some degradation in fuel economy and engine performance.

This drawback can be removed by providing suitable shut-off means reponsive to the operating temperature of the exhaust gas cleaner 21. More specifically, the introduction of the air-fuel mixture is shut off by the shut-off means when the operating temperature is above a predetermined level dictating that the warming-up of the cleaner 21 is completed.

Another embodiment implementing this concept will be described in connection with FIG. 2, in which the operating temperature is sensed directly at the cleaner 21. In more detail, a shut-off valve 27 is mounted midway of the bypass conduit 22 in series with the control valve 23. This shut-off valve 27 is adapted to close when actuated by a warming-up sensor 28, which is shown to be located adjacent to the cleaner 21. In this embodiment, the warming-up sensor includes an electric element such as a thermistor for supplying an electric signal through an electric connection 29 to the shut-off valve 27 for its actuation.

In FIG. 2, like numerals and letters will designate counter-parts shown in FIG. 1, thus explanation thereof being omitted. Likewise, the air pump 25 and air container 26 are omitted because of the restricted space allowed for FIG. 2.

The warming-up sensor 28 may also include a mechanical element, for example, a bimetal element or a thermal expansion element, which senses the operating temperature and which is mechanically linked with the shut-off valve 27 for its actuation. On the other hand, the warming-up sensor 28 may be located adjacent either to the engine housing 12 or exhaust port 18 for sensing the operating temperature respectively in terms of the engine housing temperature or of the temperature of the exhaust gases. Regarding to the relative location of the control valve 23 and shut-off valve 27, it will be understood that the former is upstream of the latter in the flow direction of the air-fuel mixture to be bypassed, and vice versa.

When the rotary engine 11 is initially started with the exhaust gas cleaner 21 being cold, and the shut-off valve 27 remains open due to the fact that the temperature of the cleaner 21 is below the predetermined level. Therefore, the control valve 23 is made to open, as has been explained with reference to FIG. 1, at the instant when the compression pressure assumes a predetermined value corresponding to the point B or C shown in FIG. 3. As a result, a locally enriched air-fuel mixture left behind in the trailing portion of the engine chamber under compression 14a is drawn by way of the bypass conduit 22 into the exhaust port 18. This enriched mixture is then burned or reacted in the exhaust gas cleaner 21 to preheat or warm up the same.

At the succeeding stage when the cleaner 21 is fully warmed up, the shut-off valve 27 is closed to prevent the air-fuel mixture under compression from spurting into the exhaust port 18. By this stage, the combustion condition of the engine 11 has already been improved together with its atomization performance. Thus, the enriched mixture which may have wetted the inner wall 13 in the trailing portion will volatilize to be well atomized mixture. Otherwise, the enriched mixture will be sucked by or mixed with the intake mixture of the succeeding cycle. In this way, the previous drawback of degradation in fuel economy and engine performance is removed after the operating temperature of the cleaner 21 is higher than the predetermined level, even if there is no introduction of the air-fuel mixture thereinto.

As is apparent from the description hereinbefore made, the exhaust noxious emission reducing system according to the invention can improve the combustion condition of an exhaust gas cleaner used in an internal combustion engine of rotary type. Therefore, the system can minimize the unburned and partially burned content in the engine exhaust gases especially during the idel or warming-up operation of the rotary engine, thus being conductive to a prominent solution for the serious air pollution problem.

What is claimed is:

1. A system for reducing unburned and partially burned gases contained in engine exhaust gases of an internal combustion engine of rotary type having an exhaust gas cleaner in its exhaust system, said system comprising:
   a bypass conduit having an inlet port open into an engine chamber under compression and an outlet port open into an exhaust system for providing fluid communication therebetween; and
   control means responsive to the compression condition of said engine chamber for periodically permitting said fluid communication so as to introduce by way of said bypass conduit into said exhaust gas cleaner a fresh air-fuel mixture from said engine chamber, wherein said control means includes a pressure relief valve mounted in said bypass conduit and responsive directly to the compression pressure in said engine chamber for effecting the periodical introduction of said fresh air-fuel mixture when said compression pressure is above a predetermined level lower than its maximum;
   whereby thee unburned and partially burned gases are afterburned to a minimum in said exhaust gas cleaner.

2. A system for reducing unburned and partially burned gases contained in engine exhaust gases of an internal combustion engine of rotary type having an exhaust gas cleaner in its exhaust system, said system comprising:
   a bypass conduit having an inlet port open into an engine chamber under compression and an outlet port open into an exhaust system for providing fluid communication therebetween; and
   control means responsive to the compression condition of said engine chamber for periodically permitting said fluid communication so as to introduce by way of said bypass conduit into said exhaust gas cleaner a fresh air-fuel mixture from said engine chamber, wherein said control means includes valve means mounted in said bypass conduit and responsive to the crank angle of said internal combustion engine for effecting the periodical introduction of said fresh air-fuel mixture when said crank angle is below a predetermined level dictating anteriority to the T.D.C. point;
   whereby the unburned and partially burned gases are afterburned to a minimum in said exhaust gas cleaner.

3. A system for reducing unburned and partially burned gases contained in engine exhaust gases of an internal combustion engine of rotary type having an exhaust gas cleaner in its exhaust system, said system comprising:

a bypass conduit having an inlet port open into an engine chamber under compression and an outlet port open into an exhaust system for providing fluid communciation therebetween, wherein the inlet port of said bypass conduit is located in a trailing portion of an engine housing defining said engine chamber for admitting therethrough an enriched fresh air-fuel mixture left behind in the trailing portion of said engine chamber; and control means responsive to the compression condition of said engine chamber for periodically permitting said fluid communication so as to introduce by way of said bypass conduit into said exhaust gas cleaner a fresh air-fuel mixture from said engine chamber, whereby the unburned and partially burned gases are afterburned to a minimum in said exhaust gas cleaner.

4. A system according to claim 2, further comprising shut-off means responsive to the operating temperature of said exhaust gas cleaner for shutting off the introduction of said fresh air-fuel mixture when said operating temperature is above a predetermined level dictating that the warming-up of said exhaust gas cleaner is completed.

5. A system according to claim 2, wherein said valve means includes a solenoid valve adapted to open when energized, and a crank angle sensor sensing said crank angle for supplying an electric signal to said solenoid valve for its energization when said crank angle reaches said predetermined level.

6. A system according to claim 2, wherein said valve means includes a mechanical valve adapted to open when actuated, and a mechanical linkage associated with the rotation of the rotor of said internal combustion engine for actuating said mechanical valve when said crank angle reaches said predetermined level.

7. A system according to claim 3, further comprising secondary air means for introducing fresh secondary air into said exhaust system upstream of said exhaust gas cleaner in a manner to sufficiently admix said fresh secondary air with said engine exhaust gases containing said fresh air-fuel mixture.

8. A system according to claim 7, wherein said secondary air means includes a secondary air conduit having an outlet port open into said exhaust system in the vicinity of the outlet port of said bypass conduit, and an air pump having fluid communication with said secondary air conduit for pumping out therethrough said fresh secondary air having a pressure level higher than a probable exhaust back pressure in the exhaust port of said internal combustion engine.

9. A system according to claim 8, wherein said secondary air means further includes an air container mounted between said secondary air conduit and air pump for temporarily storing said fresh secondary air before its introduction.

10. A system according to claim 3, further comprising shut-off means responsive to the operating temperature of said exhaust gas cleaner for shutting off the introduction of said fresh air-fuel mixture when said operating temperature is above a predetermined level dictating that the warming-up of said exhaust gas cleaner is completed.

11. A system according to claim 10, wherein said shut-off means includes a shut-off valve mounted said bypass conduit in series with said control means and adapted to close when actuated, and a warming-up sensor sensing the operating temperature of said exhaust gas cleaner for actuating said shut-off valve when said operating temperature is above said predetermined level.

12. A system according to claim 11, wherein said warming-up sensor is located adjacent to an engine housing defining said engine chamber for sensing said operating temperature in terms of the temperature of said engine housing.

13. A system according to claim 11, wherein said warming-up sensor is located adjacent to said exhaust system for sensing said operating temperature in terms of the temperature of said engine exhaust gases.

14. A system according to claim 11, wherein said warming-up sensor is located adjacent to said exhaust gas cleaner for sensing said operating temperature in terms of the temperature of said exhaust gas cleaner.

15. A system according to claim 11, wherein said warming-up sensor includes a mechanical element mechanically linked with said shut-off valve for its actuation.

16. A system according to claim 15, wherein said mechanical element includes a bimetal element for sensing said operating temperature.

17. A system according to claim 15, wherein said mechanical element includes a thermal expansion element for sensing said operating temperature.

18. A system according to claim 11, wherein said warming-up sensor includes an electric element for supplying an electric signal to said shut-off valve for its actuation.

19. A system according to claim 18, wherein said electric element includes a thermistor for sensing said operating temperature.

* * * * *